(12) United States Patent
Kohmura et al.

(10) Patent No.: US 7,118,775 B2
(45) Date of Patent: Oct. 10, 2006

(54) PROCESS FOR PRODUCING A FLAVOR-ENHANCING MATERIAL FOR FOODS

(75) Inventors: Masanori Kohmura, Kawasaki (JP); Yasushi Nishimura, Kawasaki (JP); Koh-ichiro Sano, Kawasaki (JP); Hirokazu Kawaguchi, Kawasaki (JP); Gaku Hibino, Kawasaki (JP); Reiko Sugimoto, Kawasaki (JP); Hiroaki Nishiuchi, Kawasaki (JP); Hidehiko Wakabayashi, Kawasaki (JP); Yoichi Ueda, Kawasaki (JP); Kyousuki Ishiguro, deceased, late of Kawasaki (JP); by Minori Ishiguro, legal representative, Yokohama (JP); by Tatsuya Ishiguro, legal representative, Tokyo (JP); by Shouji Ishiguro, legal representative, Yokohama (JP); by Youhei Ishiguro, legal representative, Hachioji (JP)

(73) Assignee: Ajinomoto Co., Inc., Tokyo (JP)

( * ) Notice: Subject to any disclaimer, the term of this patent is extended or adjusted under 35 U.S.C. 154(b) by 530 days.

(21) Appl. No.: 10/307,431

(22) Filed: Dec. 2, 2002
(Under 37 CFR 1.47)

(65) Prior Publication Data

US 2004/0265471 A1    Dec. 30, 2004

Related U.S. Application Data

(63) Continuation of application No. 09/807,424, filed as application No. PCT/JP99/06576 on Nov. 25, 1999, now abandoned.

(30) Foreign Application Priority Data

| Nov. 26, 1998 | (JP) | ................... 10-335385 |
| Nov. 26, 1998 | (JP) | ................... 10-335386 |
| Jul. 8, 1999 | (JP) | ................... 11/194172 |
| Jul. 8, 1999 | (JP) | ................... 11-194209 |

(51) Int. Cl.
  C12P 13/12  (2006.01)
  A23J 1/18   (2006.01)
(52) U.S. Cl. .................. 426/656; 426/535; 435/113
(58) Field of Classification Search .......... 426/60, 426/61, 62, 534, 535, 650, 656, 520; 435/113
See application file for complete search history.

(56) References Cited

FOREIGN PATENT DOCUMENTS

| JP | 61-282397 | 12/1986 |
| JP | 6-70752 | 3/1994 |
| JP | 8-228714 | 9/1996 |

OTHER PUBLICATIONS

M.T. Elskens, et al., Database Biosis 'Online!, Database Accession No. PREV1991911348800, XP-002192046, 1 Page, Glutathione as an Endogenous Sulfur Source in the Yeast Saccharomyces-Cerevisiae, 1991.
Patent Abstracts of Japan, JP 04-066069, Mar. 2, 1992.
Patent Abstracts of Japan, JP 04-091762, Mar. 25, 1992.
Ohtake, et al., Bioscience and Industry, vol. 50, No. 10, pp. 989-994, 1992, Japanese language only.
Ohtake, et al., Bioscience and Industry, vol. 50, No. 10, pp. 989-994, 1992 (English Translation).

*Primary Examiner*—Keith Hendricks
(74) *Attorney, Agent, or Firm*—Oblon, Spivak, McClelland, Maier & Neustadt, P.C.

(57) ABSTRACT

The present invention relates to a method for producing a cysteine-rich food material by maintaining a food material containing γ-glutamylcysteine at a ratio of at least 1 wt % to the solid content thereof at a temperature ranging from 50 to 120° C. and at a pH ranging from 1 to 7. This process is conducted in the absence of a sugar and in the presence of water. The present invention also relates to a method for producing a cysteine-rich food material by reacting the food material with a γ-glutamyl peptide hydrolase at a pH ranging from 3 to 9 and at a temperature ranging from 15 to 70° C. in the present of water. Further, the present invention relates to a method for producing a flavor-enhancing material for use in food, food products obtained by these processes, and yeast cells or extracts for use in food products.

16 Claims, 8 Drawing Sheets

Amounts of sulfur compounds in the H4ΔGSH2 yeast cells

Change in amounts of sulfur compounds
in the H4ΔGSH2 yeast extract

SEQUENCE LISTING

<160> NUMBER OF SEQ ID NOS: 5

<210> SEQ ID NO 1
<211> LENGTH: 21

```
<212> TYPE: DNA
<213> ORGANISM: Artificial Sequence
<220> FEATURE:
<223> OTHER INFORMATION: Synthetic DNA

<400> SEQUENCE: 1
tatgaagact gtacagtctc c                                              21

<210> SEQ ID NO 2
<211> LENGTH: 34
<212> TYPE: DNA
<213> ORGANISM: Artificial Sequence
<220> FEATURE:
<223> OTHER INFORMATION: Synthetic DNA

<400> SEQUENCE: 2
ccggggagct cagctaaatg gtgtacttcg ctac                                34

<210> SEQ ID NO 3
<211> LENGTH: 29
<212> TYPE: DNA
<213> ORGANISM: Artificial Sequence
<220> FEATURE:
<223> OTHER INFORMATION: Synthetic DNA

<400> SEQUENCE: 3
attaacccgg gttgattcgg taatctccg                                      29

<210> SEQ ID NO 4
<211> LENGTH: 30
<212> TYPE: DNA
<213> ORGANISM: Artificial Sequence
<220> FEATURE:
<223> OTHER INFORMATION: Synthetic DNA

<400> SEQUENCE: 4
attaacccgg ggtttttag ttttgctggc                                      30

<210> SEQ ID NO 5
<211> LENGTH: 23
<212> TYPE: DNA
<213> ORGANISM: Artificial Sequence
<220> FEATURE:
<223> OTHER INFORMATION: Synthetic DNA

<400> SEQUENCE: 5
agctaaatgg tgtacttcgc tac                                            23
```

PROCESS FOR PRODUCING A FLAVOR-ENHANCING MATERIAL FOR FOODS

CROSS-REFERENCE TO RELATED APPLICATIONS

The present application is a Continuation of U.S. Ser. No. 09/807,424 filed on Oct. 15, 2001, abandoned, which is a 371 application of PCT/JP99/06576 filed Nov. 25, 1999.

TECHNICAL FIELD

The present invention relates to a method of easily obtaining a cysteine-rich food material (in the present specification, "cysteine" including its oxidized form disulfide 'cystine' unless otherwise noted) wherein a food material such as a yeast extract or yeast cells containing γ-glutamylcysteine (in the present specification, "γ-glutamylcysteine" including its oxidized form disulfide unless otherwise noted) at a ratio of at least 1% (weight %) to the solid content thereof (i.e., in an amount of 1 or more weight % based on the solid content thereof) as the starting material is heated in an acidic to neutral pH range, or a γ-glutamyl peptide hydrolase is allowed to act thereon.

The present invention relates further to a method of easily obtaining a flavor-enhancing material for foods wherein a food material such as a yeast extract or yeast cells containing γ-glutamylcysteine at a ratio of at least 1% (weight %) to the solid content thereof as the starting material is heated in an acidic to neutral pH range, or a γ-glutamyl peptide hydrolase is allowed to act thereon, and then each resulting mass is added with a reducing sugar, as well as to a method of producing a flavor-enhancing agent for foods wherein a flavor-enhancing material for foods obtained in such a way described just above is heated.

The present invention relates still further to yeast cells per se or a yeast extract per se for foods having a high content of γ-glutamyl-cysteine, as well as to a method of producing the same.

BACKGROUND ART

Cysteine is used for the purpose of, e.g., flavor improvement of foods. The conventional methods of producing cysteine include proteolysis, semi-synthesis etc., and the methods being mainly used at present are proteolysis and semi-synthesis.

When cysteine is to be used for the above purpose, there is strong need for food materials with a high content of cysteine (i.e., cysteine-rich food materials), but such food materials with a high content of cysteine are hardly known heretofore.

Indeed, there may be mentioned, as an example of accumulating γ-glutamylcysteine within yeast cells, an article wherein γ-glutamylcysteine synthetase was excessively expressed by a genetic engineering procedure, whereby γ-glutamylcysteine was accumulated in a maximal amount of 2% based on the dried yeast cells (Ohtake et al., Bioscience and Industry, vol.50, No.10, pp.989–994 (1992)). It is to be noted, however, that those results were obtained by the use of a yeast accumulating γ-glutamylcysteine in a larger amount, i.e., a laboratory model yeast made by a genetic engineering procedure which usually never happens in nature. Nor is there described in the article any idea of utilizing the yeast as a material for foods.

Further, it is known that γ-glutamylcysteine or a yeast extract or the like containing γ-glutamylcysteine when added to foods enhances "kokumi" (thickness, mouthfulness and continuity) of the food. Further, it is known that food materials obtained by heating γ-glutamylcysteine or a yeast extract or the like containing γ-glutamylcysteine in the presence of a sugar are effective in improving the flavors of foods, as described in, e.g., JP-A 4-66069 and JP-A 4-91762.

More specifically, the former (JP-A 4-66069) describes: "As a result of extensive study to obtain a more preferable meat flavor seasoning, the inventors have found that high-quality roast meat flavor-like seasonings excellent in stability and free of the above-described unpleasant odors and unpleasant tastes derived from yeast can be obtained by adding sugars and, as necessary, amino acids to a yeast extract containing 2 to 20% by weight (solid content) of sulfur-containing compounds such as glutathione, cysteine, or glutamylcysteine" (at the beginning of the "Means to Solve the Problem" section of the patent document), and on the basis of the findings, the inventors had completed "A process for producing seasonings, which comprises adding sugars and, as necessary, amino acids to a yeast extract containing a certain amount (2 to 20% by weight of the extract) of sulfur-containing compounds such as glutathione, cysteine, or glutamyl-cysteine and then heating the mixture at a temperature of 70 to 180° C. for 10 to 180 minutes in the absence of fats and oils" (the "claims" section of the patent document).

Further, the latter (JP-A 4-91762) describes: "Although there are a wide variety of existing meat flavors, all of them have different qualities from natural roast flavors of meat and there has been a need for an agent imparting flavors more similar qualities to natural roast meat flavors" (the "Problem to Be Solved by the Invention" section of the patent document); and "As a result of research on a wide variety of flavors resulting from heat-browning various amino acids and sugars for the purpose of solving these drawbacks, it has been found that a flavor composition having excellent roast meat flavors which could not be achieved heretofore can be produced by adding sugars to γ-glutamylcysteine, then dissolving the mixture in water, and heat-reacting the solution at a temperature of 70 to 180° C. for 10 to 180 minutes, and the present invention has been thereby completed" (the "Means to Solve the Problem" section of the patent document); and discloses "A process for producing a flavor composition, which comprises adding a sugar to γ-glutamylcysteine and heating the mixture at a temperature of 70 to 180° C. for 10 to 180 minutes."

However, it has been noted that these flavor seasonings have the problem of burnt smells getting intensified with increased meat flavors.

DISCLOSURE OF THE INVENTION

Under the background of the prior art described above, an object of the present invention is to provide a food material with a high content of cysteine, i.e., cysteine-rich food material.

Under the background of the prior art described above, another object of the present invention is to provide a flavor-enhancing material for foods and a flavor-enhancing agent for foods which enhance flavors such as beef flavors or dried-bonito flavors of foods or drinks, being free of the drawbacks of strong burnt smells or the like described above.

Under the background of the prior art described above, still another object of the present invention is to provide yeast cells for foods or a yeast extract therefrom having a high content of γ-glutamylcysteine and suitable as the starting material for the above-described food material, flavor-enhancing material for foods, or flavor-enhancing agent for foods.

As a result of their eager study to achieve these objects described above, the present inventors have found that γ-glutamylcysteine upon heating at a temperature of 50 to 120° C. and in a pH range of 1 to 7 is decomposed in a period of 3 to 300 minutes into cysteine and PCA (pyrrolidone carboxylic acid), whereby cysteine can be obtained in a high yield as a whole, that upon hydrolysis of γ-glutamylcysteine with a γ-glutamyl peptide hydrolase, the γ-glutamylcysteine is decomposed into cysteine and glutamic acid, whereby cysteine can be obtained in a high yield as a whole, and also that by similarly heating yeast cells or a yeast extract containing 1 or more weight % of γ-glutamylcysteine in the absence of a sugar under hydrous conditions or by allowing a γ-glutamyl peptide hydrolase to act thereon, a yeast extract with a high content of cysteine can be obtained, and on the basis of these findings, have made a first embodiment of the present invention.

Accordingly, the first embodiment of the present invention relates to a process for producing a food material with a high content of cysteine, wherein a food material containing γ-glutamylcysteine at a ratio of 1 or more weight % to the solid content thereof is kept at 50 to 120° C. and pH 1 to 7 in the absence of a sugar and in the presence of water, i.e., a process for producing a cysteine-rich food material, which comprises maintaining a food material containing γ-glutamylcysteine at a ratio of 1 or more weight % to the solid content thereof, at a temperature of 50 to 120° C. and a pH value of 1 to 7 in the absence of a sugar and in the presence of water, and to a process for producing a food material with a high content of cysteine, wherein a γ-glutamyl peptide hydrolase is allowed to act at pH 3 to 9 and at 15 to 70° C. in the presence of water on a food material containing γ-glutamylcysteine at a ratio of 1 or more weight % to the solid content thereof, i.e., a process for producing a cysteine-rich food material, which comprises allowing a γ-glutamyl peptide hydrolase to act at a pH value of 3 to 9 and a temperature of 15 to 70° C. in the presence of water on a food material containing γ-glutamylcysteine at a ratio of 1 or more weight % to the solid content thereof, as well as to the process for producing a food material with a high content of cysteine described above, wherein the said food material as the starting material is a yeast extract or yeast cells.

As a result of their further extensive study to achieve the objects described above, the present inventors have found that materials obtained by heating γ-glutamylcysteine, or yeast cells or a yeast extract containing a large amount of γ-glutamylcysteine at a ratio of 1 or more weight % to the solid content thereof, at 50 to 120° C. for 3 to 300 minutes in an acidic to neutral pH range in the absence of a reducing sugar, or by allowing a γ-glutamyl peptide hydrolase to act thereon at pH 3 to 9 and at 15 to 70° C., followed by adding a reducing sugar thereto, are effective in enhancing flavors of foods, and also that such materials upon heating can serve as an excellent flavor-enhancing agent for foods, and on the basis of these findings, have made a second embodiment of the present invention.

Accordingly, the second embodiment of the present invention relates to a process for producing a flavor-enhancing material for foods, wherein γ-glutamylcysteine or a food material containing γ-glutamylcysteine at a ratio of 1 or more weight % to the solid content thereof is kept at pH 1 to 7 and 50 to 120° C. for 3 to 300 minutes in the absence of a reducing sugar and in the presence of water, and a reducing sugar is then added in an amount of 1 to 10 moles per 1 mole of the γ-glutamylcysteine, i.e., a process for producing a flavor-enhancing material for foods, which comprises maintaining γ-glutamylcysteine or a food material containing γ-glutamylcysteine at a ratio of 1 or more weight % to the solid content thereof, at a pH value of 1 to 7 and a temperature of 50 to 120° C. for a period of 3 to 300 minutes in the absence of a reducing sugar and in the presence of water, and then adding a reducing sugar to the resulting mass in an amount of 1 to 10 moles per 1 mole of the γ-glutamylcysteine present in said resulting mass, and to a process for producing a flavor-enhancing material for foods, wherein a γ-glutamyl peptide hydrolase is allowed to act at pH 3 to 9 and at 15 to 70° C. for 1 to 300 minutes in the presence of water on γ-glutamylcysteine or a food material containing γ-glutamylcysteine at a ratio of 1 or more weight % to the solid content thereof, and a reducing sugar is then added in an amount of 1 to 10 moles per 1 mole of said γ-glutamylcysteine, i.e., a process for producing a flavor-enhancing material for foods, which comprises allowing a γ-glutamyl peptide hydrolase to act at a pH value of 3 to 9 and a temperature of 15 to 70° C. for a period of 1 to 300 minutes in the presence of water on γ-glutamylcysteine or a food material containing γ-glutamylcysteine at a ratio of 1 or more weight % to the solid content thereof, and then adding a reducing sugar to the resulting mass in an amount of 1 to 10 moles per 1 mole of the γ-glutamylcysteine present in said resulting mass, as well as to a process for producing a flavor-enhancing agent for foods, wherein the flavor-enhancing material for foods as described is kept at 50 to 180° C. for 10 to 300 minutes, i.e., a process for producing a flavor-enhancing agent for foods, which comprises maintaining the flavor-enhancing material for foods as described at a temperature of 50 to 180° C. for a period of 10 to 300 minutes.

As a result of their still further extensive study to achieve the objects, the present inventions have succeeded in creating a yeast containing γ-glutamyl-systeine in a large amount of 1 or more weight % based on the dried cells, using a *Saccharomyces cerevisiae*, one of the representative yeasts for foods, and preparing a yeast extract from the thus-created yeast (in the yeast extract, γ-glutamylcysteine being contained at a high concentration) and further by heating the yeast extract, in obtaining another yeast extract containing cysteine in a larger amount than before heating, and on the basis thereof, have made a third embodiment of the present invention.

Accordingly, the third embodiment of the present invention relates to yeast cells or a yeast extract for foods which contains γ-glutamylcysteine at a ratio of 1 or more weight % to the solid content thereof.

Incidentally, it can and will be understood from what has been and will be described that the first to third embodiments of the present inventions described above constitute a group of inventions so linked as to form a single inventive concept.

Hereinafter, the present invention will be described in detail.

First, the first embodiment of the present invention will be explained.

The food material as the starting material for the process of this embodiment is a food material containing a large amount of γ-glutamylcysteine at a ratio of 1 or more weight % to the solid content thereof. A food material with a γ-glutamylcysteine content of 1 or less % is commercially not practical because of the resulting weak flavor potencies, and is therefore not preferable.

Such food materials include, e.g., a yeast extract or yeast cells containing γ-glutamylcysteine at a ratio of 1 or more weight % to the solid content thereof. Incidentally, such yeast cells with a high content of γ-glutamylcysteine can be obtained by the method of Example 7, or from a yeast occurring in nature and containing γ-glutamylcysteine in an increased amount due to mutation or a yeast mutant created by mutagenic treatment to increase the amount of γ-glutamylcysteine therein. Further, such yeast extract can be prepared by extraction from such yeast cells or autolysis thereof, or by supplmenting, with γ-glutamylcysteine, a yeast extract with a lower content of γ-glutamylcysteine than the predetermined amount described above.

According to the present invention, such a (γ-glutamyl-cysteine-rich) food material is heated and kept at 50 to 120° C. in an acidic to neutral pH range, that is, at pH 1 to 7. The amount of water present is determined from the viewpoint of operativeness and, for example, the amount of water can be 1 to 100 parts by weight per 1 part (in terms of dry weight) of the food material. A pH outside the above range may reduce unfavorably the amount of cysteine formed. Of course, adjustment of the pH can be conducted using an acid such as hydrochloric acid or a base such as sodium hydroxide acceptable for food manufacturing. If the heating temperature is too low, the progress of the decomposition reaction of γ-glutamylcysteine is delayed, whereas at too high a temperature, cysteine once formed is unfavorably reduced due to side reactions. When the food material is subjected to heat treatment under the heating conditions described above, it is possible to obtain in 3 to 300 minutes another food material with a high content of cysteine wherein cysteine has been formed and accumulated in a large amount (i.e., a cysteine-rich food material). If the heating time is too short, the reaction may not be completed, whereas given too long a heating time, the cysteine once formed is unfavorably reduced due to side reactions.

It is essential to conduct the decomposition reaction of γ-glutamylcysteine without adding a sugar, particularly a reducing sugar such as glucose, fructose, xylose or maltose, and in the absence thereof. This is to prevent the resulting cysteine from reacting with a sugar, particularly a reducing sugar, to generate burnt smells, as well as the occurrence of browning reaction.

For formation of cysteine from γ-glutamylcysteine, an enzymatic method is also mentioned. That is, an enzyme hydrolyzing the peptide bonds in γ-glutamylcysteine (γ-glutamyl peptide hydrolase) is allowed to act on the above-described γ-glutamylcysteine-rich food material at pH 3 to 9 and at 15 to 70° C. The amount of water present is determined from the viewpoint of operativeness and, for example, the amount of water may be 1 to 100 parts by weight per 1 part (in terms of dry weight) of the food material. If the pH and temperature are outside the ranges described above, the activity of the γ-glutamyl peptide hydrolase is undesirably weakened. If the γ-glutamylcysteine-rich food material is treated with such an enzyme under the conditions described above, a food material with a high content of cysteine wherein cysteine has been formed and accumulated in a large amount (a cysteine-rich food material) can be obtained in 1 to 300 minutes.

Although there are many types of γ-glutamyl peptide hydrolases, those particularly useful for carrying out the present invention include γ-glutamyl transferase, γ-glutamyl cyclotransferase, glutaminase etc.

The food material with a high content of cysteine thus prepared can be placed on the market in any suitable form including a liquid state as such, a concentrated paste state, a dried powder state, a granular state or the like.

Hereinafter, the second embodiment of the present invention described above will be explained.

First, the process for producing a flavor-enhancing material for foods according to this embodiment will be described. It can be produced, for example, as described above, by heating γ-glutamylcysteine, or yeast cells or a yeast extract containing 1 or more weight % of γ-glutamylcysteine, in an acidic to neutral pH range and in the absence of a reducing sugar, or by allowing a γ-glutamyl peptide hydrolase to act thereon, each followed by adding a sugar thereto.

The food material as the starting material used in such a process is such a food material containing a large amount of γ-glutamylcysteine at a ratio of 1 or more weight % to the solid content thereof (a γ-glutamylcysteine-rich food material), as described above in connection with the first embodiment of the present invention. A food material with a γ-glutamylcysteine content of 1 or less % is industrially not practical because of the resulting weak flavor potencies, and is therefore not preferable.

Such food materials include, e.g., a yeast extract or yeast cells containing γ-glutamylcysteine at a ratio of 1 or more weight % to the solid content thereof. Incidentally, such yeast cells with a high content of γ-glutamylcysteine can be obtained, e.g., by such genetic engineering method as will be described later in Example 7. Further, such yeast extract can be prepared by extraction from such yeast cells or autolysis thereof, or by supplmenting, with γ-glutamylcysteine, a yeast extract with a lower content of γ-glutamylcysteine than the predetermined amount described above. This is the same as has been described above in connection with the first embodiment of the present invention.

According to the present invention, γ-glutamylcysteine or such food material containing γ-glutamylcysteine in a large amount as described above is first heated and kept at 50 to 120° C. in an acidic to neutral pH range, that is, at pH 1 to 7 for 3 to 300 minutes in the absence of a reducing sugar and in the presence of water. The conditions concerning pH, temperature and reaction time per se are the same as has been described above in connection with the first embodiment of the present invention.

The amount of water present is determined from the viewpoint of operativeness and, for example, the amount of water can be 1 to 100 parts by weight per 1 part (in terms of dry weight) of the γ-glutamylcysteine or the food material with a high content of γ-glutamylcysteine.

Incidentally the present inventors have found that when γ-glutamylcysteine is heated at pH 1 to 7, at 50 to 120° C., and, for example for 3 to 300 minutes, the γ-glutamylcysteine is decomposed into cysteine and PCA (pyrrolidone carboxylic acid), whereby cysteine is obtained in a high yield as a whole, and also that when yeast cells or a yeast extract containing 1 or more weight % of γ-glutamylcysteine is heated in an analogous manner in the absence of a reducing sugar under hydrous conditions, a yeast extract with a high content of cysteine can be obtained, and the flavor-enhancing action of the composition for foods according to the present invention is attributable to the cysteine thus formed from γ-glutamylcysteine.

And, a pH outside the above range may reduce unfavorably the amount of cysteine formed. Of course, adjustment of the pH can be conducted using an acid such as hydrochloric acid or a base such as sodium hydroxide acceptable for food manufacturing. This is the same as has been described above in connection with the first embodiment of the present invention.

If the heating temperature is too low, the progress of the decomposition reaction of γ-glutamylcysteine is delayed, whereas at too high a temperature, the cysteine once formed is unfavorably reduced due to side reactions. If the heating time is too short, the reaction may not be completed, whereas given too long a heating time, the cysteine once formed is unfavorably reduced due to side reactions. This is also the same as has been described above in connection with the first embodiment of the present invention.

According to the present inventors' findings, as has been described above, when γ-glutamylcysteine is heated at a specific temperature and for a specific period of time in an acidic to neutral pH range of 1 to 7, the γ-glutamylcysteine is decomposed into cysteine and PCA (pyrrolidone carboxylic acid), whereby the cysteine is finally obtained in a high yield, or when yeast cells or a yeast extract containing 1 or more weight % of γ-glutamylcysteine is heated in an analogous manner in the absence of a reducing sugar under hydrous conditions, a yeast extract with a high content of cysteine can be obtained.

It is essential to conduct such decomposition reaction of γ-glutamylcysteine without adding a reducing sugar such as glucose, fructose, xylose or maltose, and in the absence thereof. This is to prevent the resulting cysteine from reacting with such a reducing sugar to generate burnt smells, as well as the occurrence of browning reaction. This is the same as has been described above in connection with the first embodiment of the present invention.

Furthermore, for formation of cysteine from γ-glutamylcysteine, an enzymatic method is also mentioned. That is, an enzyme hydrolyzing the peptide bonds in γ-glutamylcysteine (γ-glutamyl peptide hydrolase) is allowed to act on γ-glutamylcysteine or the above-described γ-glutamylcysteine-rich food material at pH 3 to 9, at 15 to 70° C. and for 1–300 minutes. The amount of water present is determined from the viewpoint of operativeness and, for example, the amount of water may be 1 to 100 parts by weight per 1 part (in terms of dry weight) of the food material. If the pH and temperature are outside the ranges described above, the activity of the γ-glutamyl peptide hydrolase is undesirably weakened. This is the same as has been described above in connection with the first embodiment of the present invention.

Although there are many types of γ-glutamyl peptide hydrolases, those particularly useful for carrying out the present invention include γ-glutamyl transferase, γ-glutamyl cyclotransferase, glutaminase etc. This is also the same as has been described above in connection with the first embodiment of the present invention.

The heat-treated product with a high content of cysteine thus prepared is supplemented with a reducing sugar described above in an amount of 1 to 10 moles per 1 mole of said γ-glutamylcysteine, whereby the flavor-enhancing material for foods of the present invention can be produced.

As reducing sugars, there may be mentioned glucose, fructose, xylose and maltose, and these reducing sugars are preferable for the reason of availability at low costs and applicability as food.

The amount of a reducing sugar to be added (to be used) is 1 to 10 moles per 1 mole of the γ-glutamylcysteine as the starting material or of the γ-glutamylcysteine contained in a natural food material such as yeast cells or a yeast extract as the starting material, as described above. Amounts outside this range are not preferable because given an amount below said range, the effect is weaker, while given an amount above said range, sweetness becomes too strong.

The flavor-enhancing material for foods which can be prepared in this manner can be placed on the market in any suitable form including a liquid state as such, a concentrated paste state, a dried powder state, a granular states or the like. The flavor-enhancing effect of the flavor-enhancing material for foods of the present invention is exhibited due to the reaction of cysteine with a reducing sugar contained therein in a heating step in processing treatment when used later in food manufacturing.

Next, the process for producing the flavor-enhancing agent for foods of the present invention will be described. It can be obtained, for example, by subjecting the flavor-enhancing material for foods of the present invention described above to heat treatment under suitable conditions.

In carrying out the heat treatment, the flavor-enhancing material for foods is heated, if necessary after concentrated such that the cysteine concentration reaches 0.1 weight % or more, preferably 0.6 weight % or more. The heating conditions are those under which neither burnt smells nor browning reaction occurs and within the range of 50 to 180° C. and 10 to 300 minutes. Such heating conditions include, e.g., those of a low temperature and a long time such as 50 to 60° C. and 180 to 300 minutes, and those of a high temperature and a short time such as 90 to 100° C. (around the boiling point) and 30 to 120 minutes.

For example, The flavor-enhancing agent for foods of the present invention which can be prepared in this manner, like the flavor-enhancing material for foods, can be placed on the market in any suitable form including a liquid state as such, a concentrated paste state, a dried powder state, a granular state or the like.

Finally, the third embodiment of the present invention will be described.

The inventive yeast mutant (yeast cells) for use in food containing γ-glutamylcysteine at a high content can be prepared as follows. I.e., the glutathione synthetase gene GSH2 is first disrupted to prepare a yeast mutant with no functioning glutathione synthetase, and then, the yeast mutant is cultured in a conventional manner.

Incidentally, it has been already reported that the GSH2 gene is not a gene essential for growth (Chris, M. Grant et al., Molecular Biology of the Cell, Vol. 8, pp. 1699–1707, September 1997). Because the disruption of a gene not essential for growth is a readily occurring phenomenon via spontaneous mutation of one gene, as is known, Example 7 described below of the present invention can be said as one of the outcomes potentially occurring in nature.

Concerning the present invention, additionally, a yeast extract was prepared from the prepared yeast mutant, and it has been clearly indicated that the resulting yeast extract was a food material containing a high content of γ-glutamylcysteine, and therefore cysteine.

BEST MODE FOR CARRYING OUT THE INVENTION

Hereinafter, the present invention will be described in more detail with reference to Test Examples and Examples.

First, Test Examples and Examples of the first embodiment of the present invention will be given.

Test Example 1

Formation of Cysteine by Heating from γ-glutamylcysteine

Figure 1:
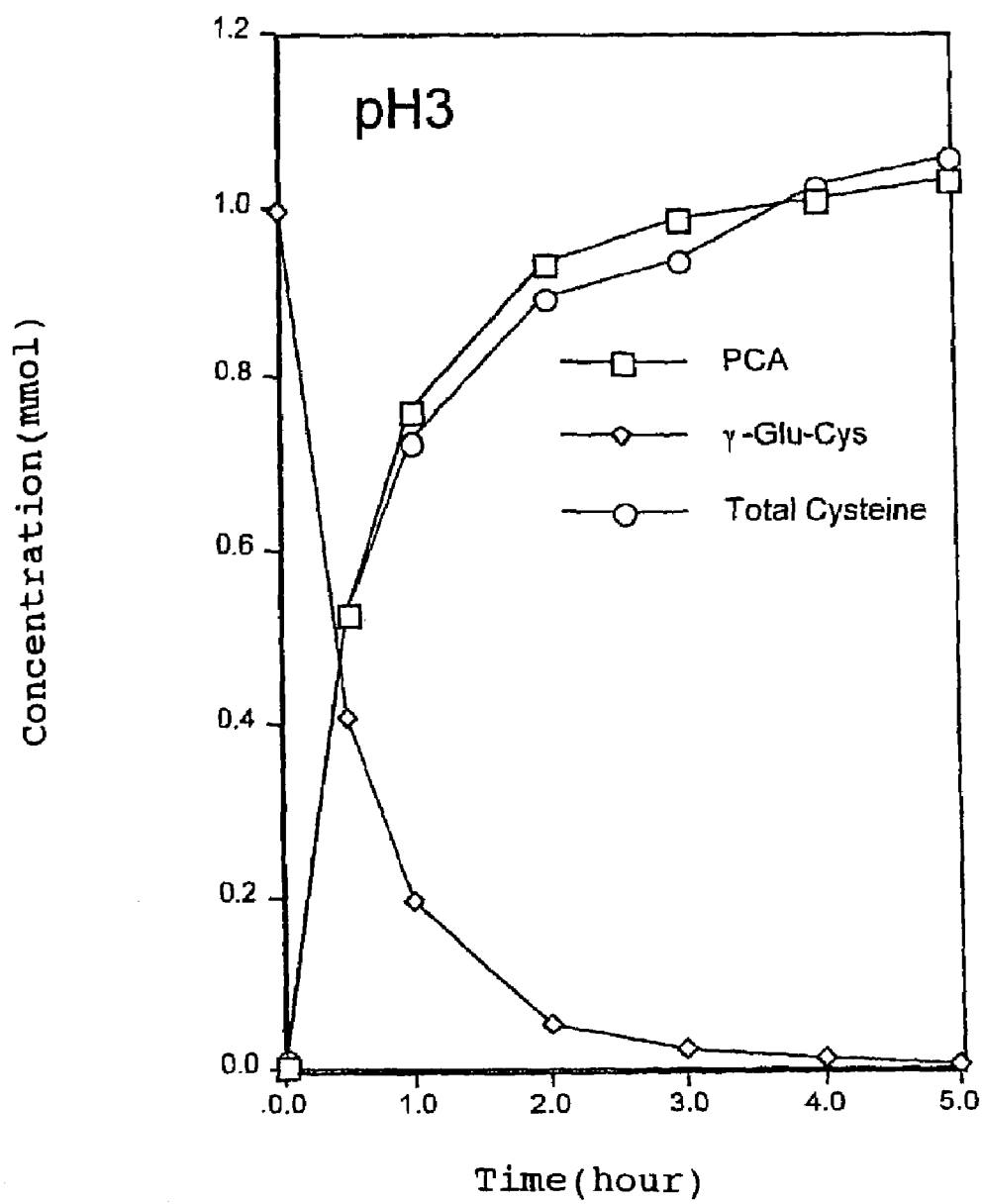
FIG. 1 shows a change with time of the amount of cysteine resulting from decomposition at pH 3 of reduced-form γ-glutamylcysteine (Test Example 1).
Figure 2:
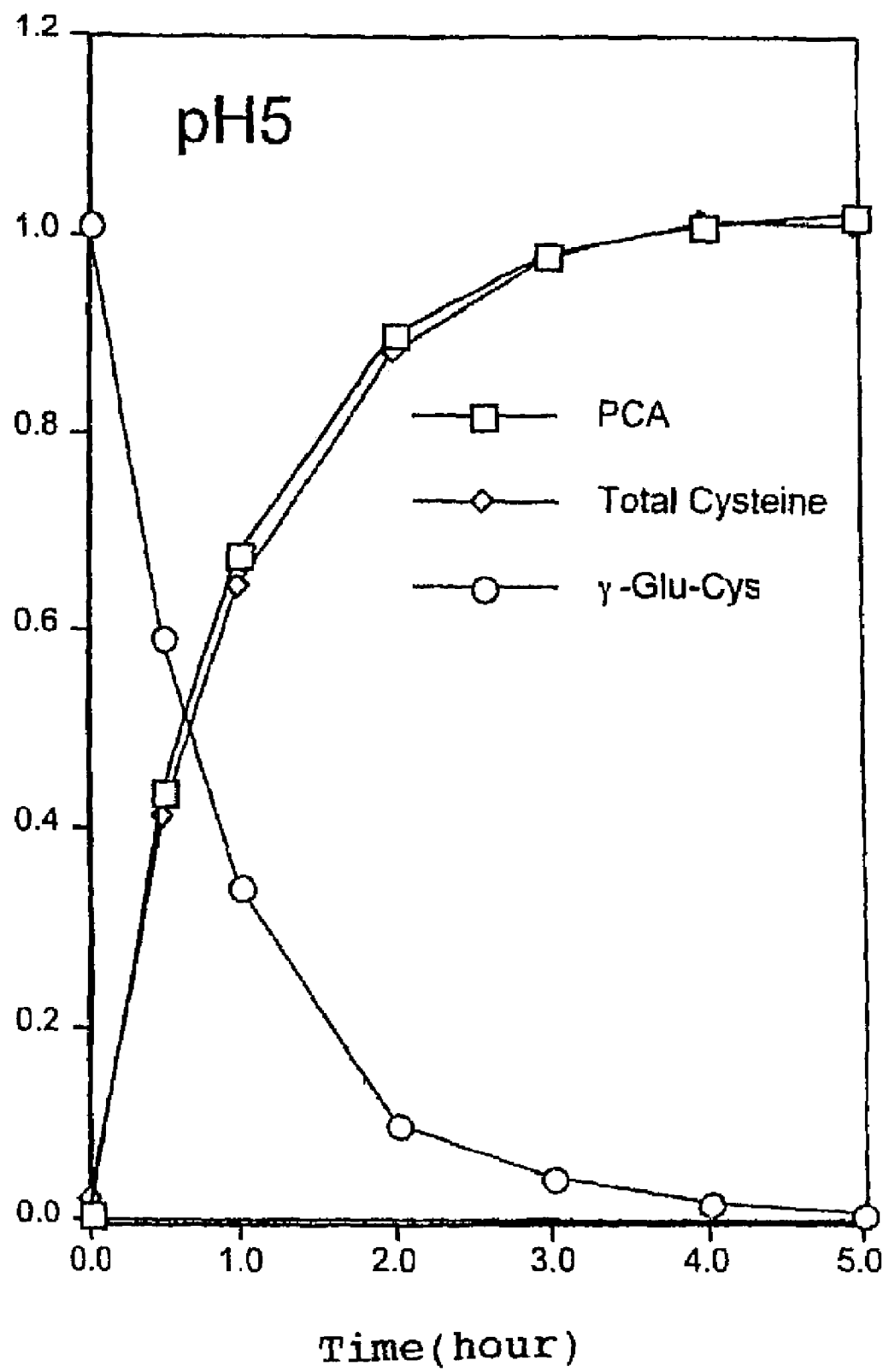
FIG. 2 shows a change with time of the amount of cysteine resulting from decomposition at pH 5 of reduced-form γ-glutamylcysteine (Test Example 1).
Figure 3:
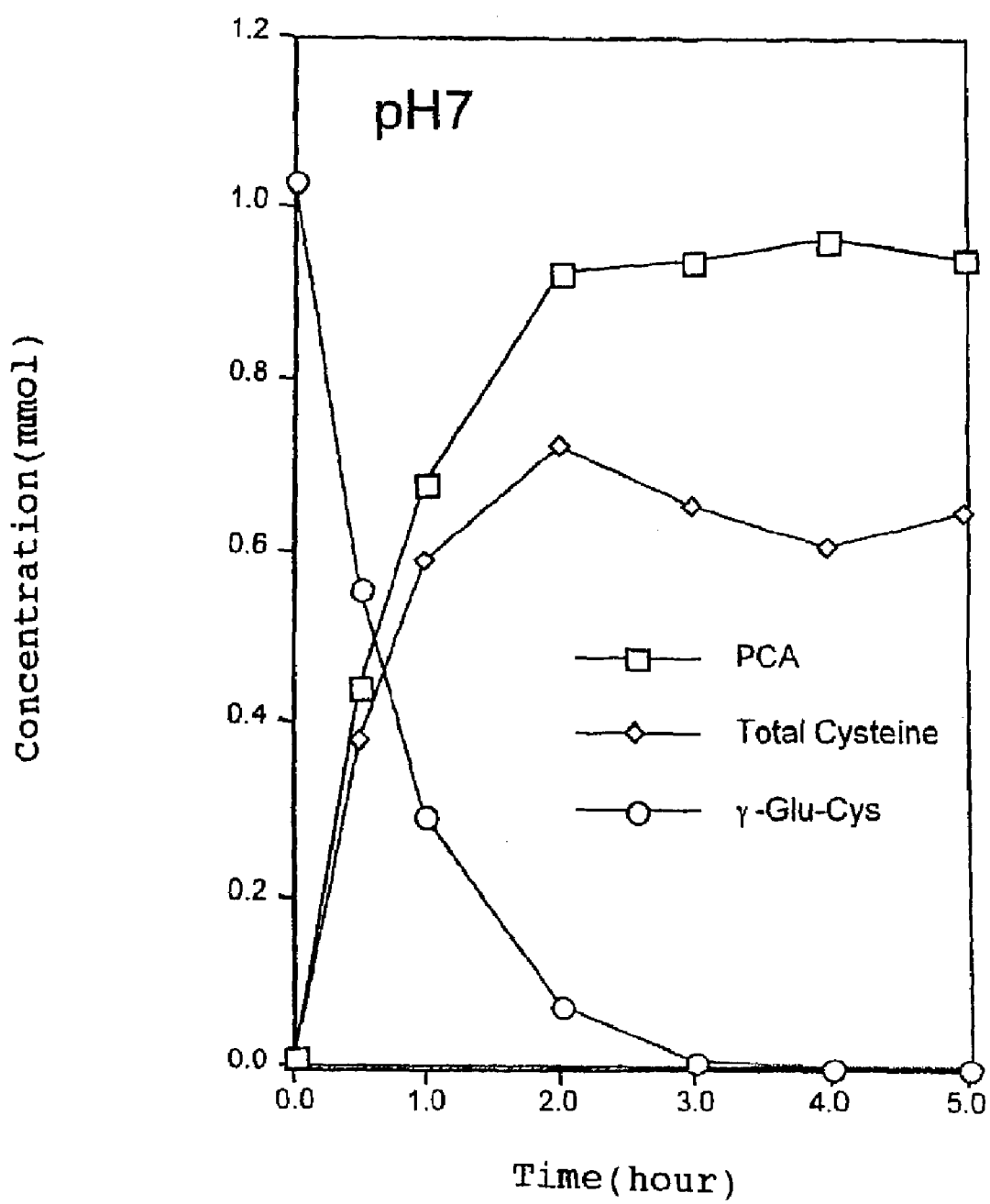
FIG. 3 shows a change with time of the amount of cysteine resulting from decomposition at pH 7 of reduced-form γ-glutamylcysteine (Test Example 1).

The amounts of the cysteine formed in aqueous 1 mmol reduced-form γ-glutamylcysteine solutions with different pH values (that is, pH 3, 5 and 7) upon heating at 98° C. were monitored with time. The results are shown in FIGS. 1 to 3 below. In these figures, "PCA" means "pyrrolidone carboxylic acid", "γ-Glu-Cys" means "reduced-form γ-glutamylcysteine", and "Total Cysteine" means "cysteine".

As can be seen from FIGS. 1 to 3, cysteine can be obtained from γ-glutamylcysteine in high yields by heating.

Test Example 2

Formation of Cysteine by an Enzyme from γ-glutamylcysteine

Figure 4:
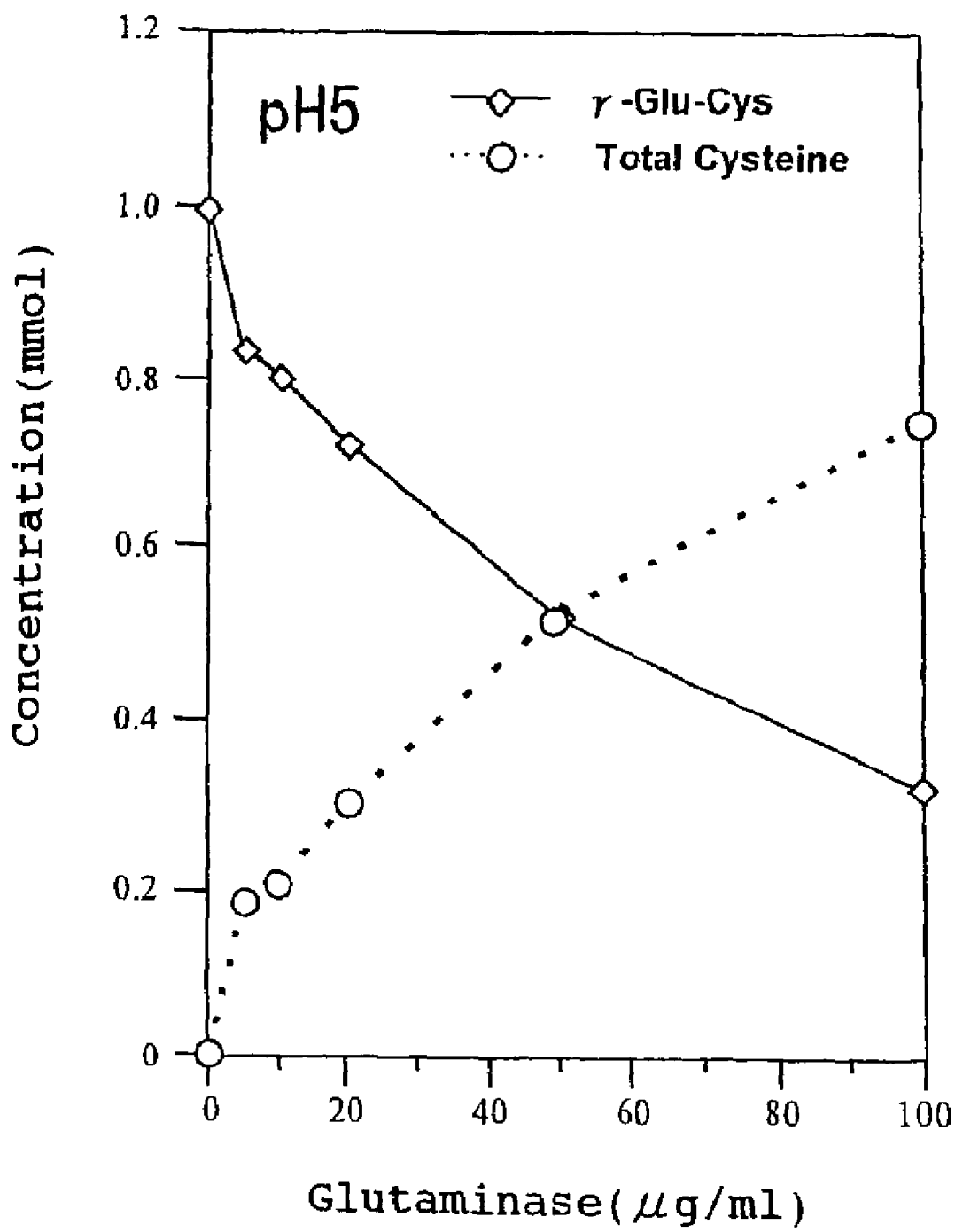
FIG. 4 shows the dependence at pH 5 of the amount of cysteine formed from decomposition of reduced-form γ-glutamylcysteine with glutaminase upon the amount of glutaminase (Test Example 2).
Figure 5:
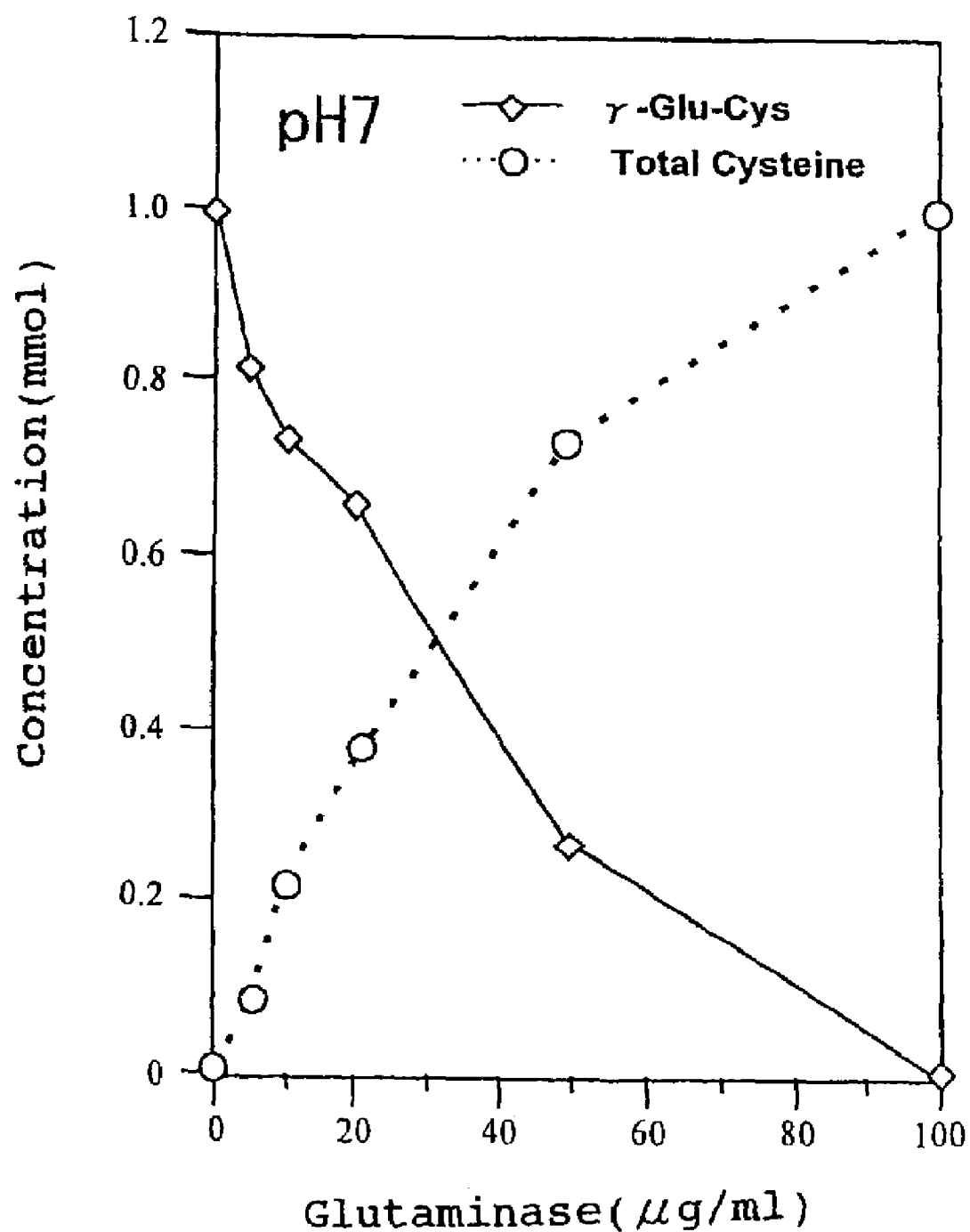
FIG. 5 shows the dependence at pH 7 of the amount of cysteine formed from decomposition of reduced-form γ-glutamylcysteine with glutaminase upon the amount of glutaminase (Test Example 2).
Figure 6:
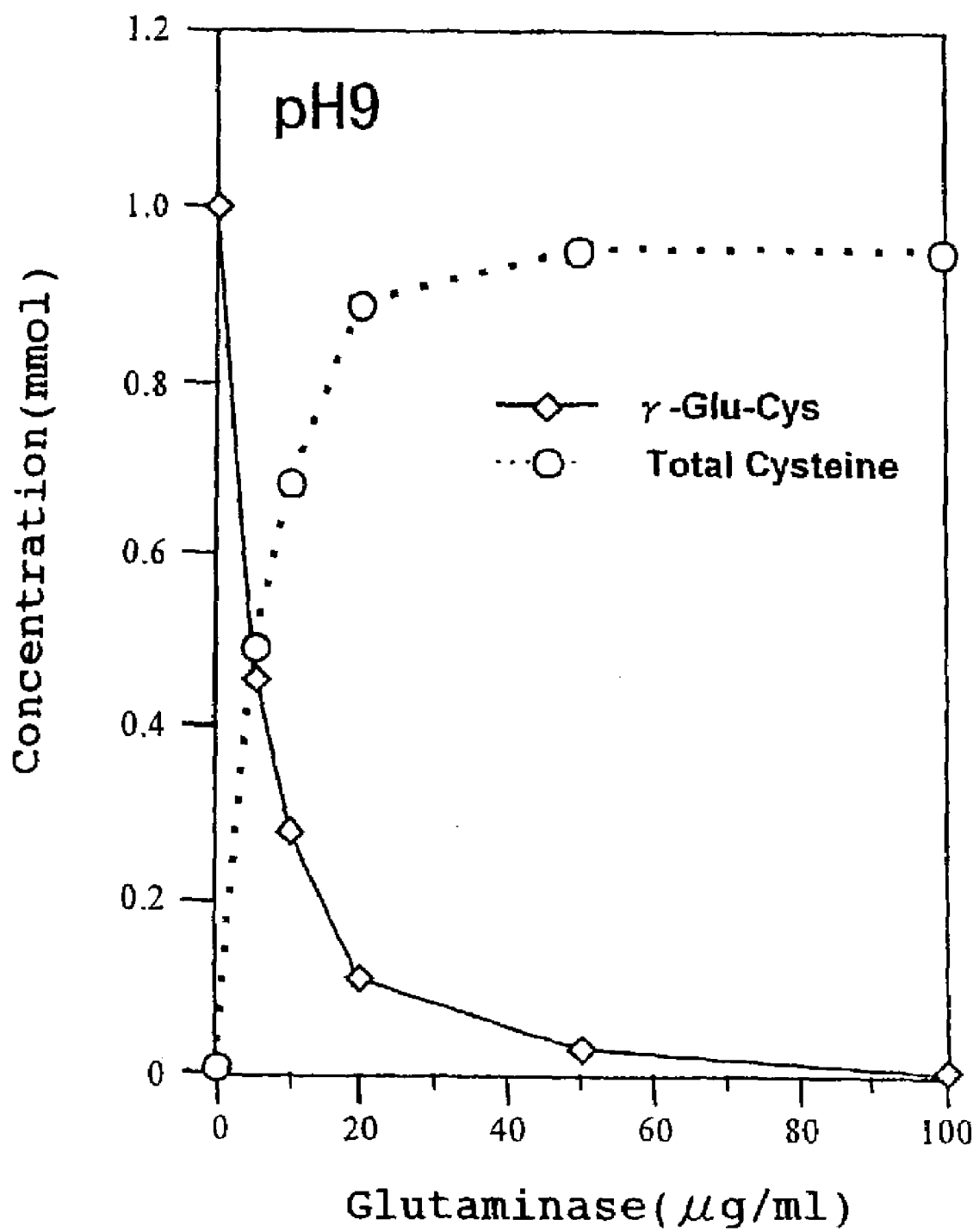
FIG. 6 shows the dependence at pH 9 of the amount of cysteine formed from decomposition of reduced-form γ-glutamylcysteine with glutaminase upon the amount of glutaminase (Test Example 2).

"Glutaminase Daiwa" (glutaminase with a specific activity of 3.0 mM/min/mg, ex Daiwa Kasei Co., Ltd., JP) was added at varying concentrations to aqueous 1 mmol reduced-form γ-glutamylcysteine solutions with different pH values (that is, pH 5, 7 and 9), and the amounts of the cysteine formed upon action of the enzyme at 37° C. for 10 minutes were examined (dependence of hydrolysis of γ-glutamylcysteine upon the amount of the enzyme). The results are shown in FIGS. 4 to 6 below. In these figures, "γ-Glu-Cys" means "reduced-form γ-glutamylcysteine", and "Total Cysteine" means "cysteine".

As can be seen from FIGS. 4 to 6, equimolar cysteine can be obtained (in high yield) from hydrolysis of γ-glutamylcysteine with glutaminase.

EXAMPLE 1

Water was added to a yeast extract powder containing 4.5% γ-glutamylcysteine. The mixture was then adjusted to pH 5 with hydrochloric acid to prepare an aqueous 2% solution, which was heated at 98° C. for 180 minutes and then lyophilized whereby a yeast extract powder containing 2.0% cysteine was obtained.

Incidentally, when this yeast extract powder was used in producing a seasoning, a seasoning having good roast meat flavors was obtained.

EXAMPLE 2

Water was added to a yeast extract powder containing 4.5% γ-glutamylcysteine. The mixture was then adjusted to pH 7 with an aqueous 1 N NaOH to prepare an aqueous 2% solution. To the solution was added glutaminase (the same as in Test Example 2) in such amount that the concentration was 1 mg/ml in the solution, then the resultant mixture was incubated at 37° C. for 10 minutes and lyophilized, whereby a yeast extract powder containing 2.5% cysteine was obtained.

Incidentally, when this yeast extract powder was used in producing a seasoning, a seasoning having good roast meat flavors, similar to that of Example 1, was obtained.

Next, Examples and Test Example of the second embodiment of the present invention will be given.

EXAMPLE 3

γ-glutamylcysteine

An aqueous solution containing 4% γ-glutamylcysteine and adjusted to pH 5 with aqueous 1 N NaOH, was heated at 98° C. for 3 hours. After heating, to this solution was added glucose in an amount of 4% based on the solution (i.e., 1.4 moles per 1 mole of the γ-glutamylcysteine) (to give an inventive flavor-enhancing material for foods). This material was heated at 60° C. for 180 minutes and then lyophilized (to give an inventive flavor-enhancing agent for foods).

With respect to the lyophilized product (a flavor-enhancing agent for foods of the present invention) thus obtained, an organoleptic examination was carried out, using a system of a commercial beef consommé. In greater detail, this lyophilized product was added to the commercial beef consommé in an amount of 0.05% based on the solid content thereof, while the commercial beef consommé free of this product was used as the control. And which one was preferable or stronger out of the two soups concerning various evaluation items was determined by a panel of 15 persons.

The results are shown in Table 1 below. The number of persons in the table is the number of persons who selected the corresponding soup as preferable or stronger one.

TABLE 1

| 0.05% added | Evaluation Results | |
|---|---|---|
| | Present Invention | Control |
| Strength of meat flavor | 15 persons | 0 person |
| Preference of meat flavor | 14 persons | 1 person |
| Strength of whole flavor | 13 persons | 2 persons |
| Preference of whole flavor | 12 persons | 3 persons |
| Comprehensive estimation | 13 persons | 2 persons |

EXAMPLE 4

γ-glutamylcysteine

Glutaminase was added in such amount that the concentration was 1 mg/ml, to an aqueous solution containing 4% γ-glutamylcysteine previously adjusted to pH 7 with aqueous 1 N NaOH. The mixture was incubated at 37° C. for 2 hours. After reaction, to the solution was added glucose in an amount of 4% based on the solution (i.e., 1.4 moles per 1 mole of the γ-glutamylcysteine) (to give an inventive flavor-enhancing material for foods). This material was heated at 60° C. for 180 minutes and then lyophilized (to give an inventive flavor-enhancing agent for foods).

With respect to the lyophilized product (a flavor-enhancing agent for foods of the present invention) thus obtained, an organoleptic examination was carried out, using a system of a commercial beef consommé. In greater detail, this lyophilized product was added to the commercial beef consommé in an amount of 0.05% based on the solid content thereof, while the commercial beef consommé free of this product was used as the control. And which one was preferable or stronger out of the two soups concerning various evaluation items was determined by a panel of 15 persons.

The results are shown in Table 2 below. The number of persons in the table is the number of persons who selected the corresponding soup as preferable or stronger one.

TABLE 2

Evaluation Results

| 0.05% added | Present Invention | Control |
|---|---|---|
| Strength of meat flavor | 15 persons | 0 person |
| Preference of meat flavor | 15 persons | 0 person |
| Strength of whole flavor | 12 persons | 3 persons |
| Preference of whole flavor | 14 persons | 1 person |
| Comprehensive estimation | 13 persons | 2 persons |

EXAMPLE 5

Yeast Extract

A yeast extract containing 4.5% γ-glutamylcysteine was adjusted to pH 5 with aqueous 1 N NaOH to give an aqueous 20% solution (the concentration of γ-glutamylcysteine in this aqueous solution being 0.9%). The aqueous solution was then heated at 98° C. for 3 hours. After heating, to this solution was added glucose in an amount of 1.8% based on the solution (i.e., 2.8 moles per 1 mole of the γ-glutamylcysteine) (to give an inventive flavor-enhancing material for foods). This material was heated in the same manner as in Example 1, concentrated and then spray-dried (to give an inventive flavor-enhancing agent for foods).

With respect to this lyophilized product thus obtained (a flavor-enhancing agent for foods of the present invention), an organoleptic examination was carried out, using the following systems: (a) commercial beef consommé, (b) curry, and (c) Japanese clear soup. The results are shown in Table 3 below. In greater detail, this lyophilized product was added in the predetermined amounts based on the solids shown in the table, while a sample free of this product was used as the control. The organoleptic examination was carried out, using a panel of 15 persons and in the same manner as in Example 3.

TABLE 3

Evaluation results

|  | Present Invention | Control |
|---|---|---|
| (a) Commercial beef consommé | | |
| 0.05% added | | |
| Strength of meat flavor | 14 persons | 1 person |
| Preference of meat flavor | 13 persons | 2 persons |
| Strength of whole flavor | 12 persons | 3 persons |
| Preference of whole flavor | 13 persons | 2 persons |
| Comprehensive estimation | 13 persons | 2 persons |
| (b) Curry | | |
| 0.1% added | | |
| Strength of meat flavor | 13 persons | 2 persons |
| Preference of meat flavor | 12 persons | 3 persons |
| Strength of whole flavor | 13 persons | 2 persons |
| Preference of whole flavor | 12 persons | 3 persons |
| Comprehensive estimation | 13 persons | 2 persons |
| (c) Japanese Clear soup | | |
| 0.1% added | | |
| Strength of Jap. dashi flavor | 15 persons | 0 person |
| Preference of Jap. dashi flavor | 14 persons | 1 person |
| Strength of whole flavor | 14 persons | 1 person |
| Preference of whole flavor | 13 persons | 2 persons |
| Comprehensive estimation | 14 persons | 1 person |

EXAMPLE 6

Yeast Extract

A yeast extract containing 4.5% γ-glutamylcysteine was adjusted to pH 7 with aqueous 1 N NaOH to give an aqueous 20% solution (the concentration of the γ-glutamylcysteine in this aqueous solution being 0.9%). Glutaminase was added thereto in such amount that the concentration was 1 mg/ml, and the mixture was incubated at 37° C. for 2 hours. After the reaction, to this solution was added glucose in an amount of 1.8% based on the solution (i.e., 2.8 moles per 1 mole of the γ-glutamylcysteine) (to give an inventive flavor-enhancing material for foods). This material was heated in the same manner as in Example 1, concentrated and then spray-dried (to give an inventive flavor-enhancing agent for foods).

With respect to this lyophilized product (a flavor-enhancing agent for foods of the present invention) an organoleptic examination was carried out, using the following systems: (a) commercial beef consommé, (b) curry, and (c) Japanese clear soup. The results are shown in Table 4 below. In greater detail, this lyophilized product was added in the predetermined amounts based on the solids shown in the table, while a sample free of this product was used as the control. The organoleptic examination was carried out, using a panel of 15 persons and in the same manner as in Example 3.

TABLE 4

Evaluation results

|  | Present Invention | Control |
|---|---|---|
| (a) Commercial beef consommé | | |
| 0.05% added | | |
| Strength of meat flavor | 12 persons | 3 persons |
| Preference of meat flavor | 14 persons | 1 person |

TABLE 4-continued

| | Evaluation results | |
|---|---|---|
| | Present Invention | Control |
| Strength of whole flavor | 12 persons | 3 persons |
| Preference of whole flavor | 14 persons | 1 person |
| Comprehensive estimation | 14 persons | 1 person |
| (b) Curry | | |
| 0.1% added | | |
| Strength of meat flavor | 12 persons | 3 persons |
| Preference of meat flavor | 13 persons | 2 persons |
| Strength of whole flavor | 12 persons | 3 persons |
| Preference of whole flavor | 12 persons | 3 persons |
| Comprehensive estimation | 13 persons | 2 persons |
| (c) Japanese Clear soup | | |
| 0.1% added | | |
| Strength of Jap. dashi flavor | 15 persons | 0 person |
| Preference of Jap. dashi flavor | 15 persons | 0 person |
| Strength of whole flavor | 14 persons | 1 person |
| Preference of whole flavor | 15 persons | 0 person |
| Comprehensive estimation | 15 persons | 0 person |

Test Example 3

Glucose was added to a 4% γ-glutamylcysteine solution in an amount of 4% based on the solution, and the solution was then adjusted to pH 5, heated at 98° C. for 3 hours and immediately lyophilized.

With respect to the lyophilized sample thus obtained (Comparative sample) and the flavor-enhancing agent for foods of the present invention (lyophilized product=Sample of the present invention), an organoleptic examination was carried out, using a system of commercial beef consommé. In greater detail, these 2 kinds of lyophilized products were added to commercial beef consommé in an amount of 0.05% relative to the solids thereof, respicicely, and their comparative evaluation was conducted by a panel of 15 persons. That is, the 2 kinds of lyophilized products were rated by each panelist on the basis of the evaluation criteria set forth under Table 5 below, and an average was taken.

TABLE 5

| | Evaluation results | |
|---|---|---|
| 0.05% added | Comparative Sample | Sample of Invention |
| Strength of burnt smell | 4.6 | 4.2 |
| Strength of meat flavor | 4.3 | 4.6 |
| Strength of whole flavor | 4.4 | 4.8 |
| Preference of whole flavor | 4.2 | 4.6 |

Evaluation Criteria

Score:

5: Very strong or preferable.

4: Strong or preferable.

3: Slightly strong or slightly preferable.

2: Slightly weak or slightly not preferable.

1: Weak or not preferable.

Finally, Example of the third embodiment of the present invention will be given.

EXAMPLE 7

(a) The following description is about the creation of a yeast mutant for use in food, containing γ-glutamylcysteine in an amount of 1 or more % by weight based on the dry microbial cells.

In the intracellular metabolism of yeast, γ-glutamylcysteine is present as the intermediate metabolite immediately before the formation of glutathione (GSH). Glutathione synthetase functions as an enzyme to convert γ-glutamylcysteine to glutathione. Therefore, attempts were made to accumulate γ-glutamylcysteine intracellularly in a yeast for use in food, by inactivating the function of the glutathione synthetase gene (referred to as "GSH2" hereinafter).

(1) one-step-gene disruption method was carried out as the method of inactivating the function of the GSH2 gene. Accordingly, the GSH2 gene disrupting cassette required therefor was first prepared.

In greater detail, a commercially available yeast *Saccharomyces cerevisiae* (baker's yeast) for use in food was allowed to form spores by an ordinary method, and the spores were, in turn, allowed to germinate to give yeast strains. A gene region of one of the strains (referred to as "Strain H4" hereinbelow), i.e., a region of from the upstream region of the GSH2 gene to the terminus of the GSH2 gene was amplified by the PCR method. The conditions are as shown in Table 6 below.

TABLE 6

| | |
|---|---|
| Yeast chromosome gene | 1 μl |
| 10x PCR buffer | 10 μl |
| 10 mM dNTPs | 10 μl |
| 10 pmol/μl GAL11F (primer) | 1 μl |
| Sequence: 5'-TATGAAGACTGTACAGTCTCC-3' | |
| (same sequence SQ ID No. 1 given later) | |
| 10 pmol/μl GSH2R3 (primer) | 1 μl |
| Sequence: | |
| 5'-CCGGGGAGCTCAGCTAAATGGTGTACTTCGCTAC-3' | |
| (same sequence SQ ID No. 2 given later) | |
| Milli-Q water | 76 μl |
| Taq polymerase | 1 μl |
| Total | 100 μl |

Note:
30 Cycles of 94° C. for 1 min, 94° C. for 30 sec, 60° C. for 40 sec, and 74° C. for 1 min 30 sec were repeated.

The thus amplified gene fragments (GSH2) was, by an ordinary procedure, ligated to plasmid pGEM-T Easy (Promega Co.) and cloned (referred to as "GSH2/pGEM").

The URA3 gene was amplified by the PCR method in the same manner, to be used as a selective gene marker in the one-step-gene-disruption method. The conditions are shown in Table 7 below.

TABLE 7

| | |
|---|---|
| 10 ng/μl pYES32 (ex Invitrogen Co.) | 1 μl |
| 10x PCR buffer | 10 μl |
| 10 mM dNTPs | 10 μl |
| 10 pmol/μl URA3F2 (primer) | 1 μl |
| Sequence: | |
| 5'-ATTAACCCGGGTTGATTCGGTAATCTCCG-3' | |
| (same sequence SQ ID No. 3 given later) | |
| 10 pmol/μl URA3R2 (primer) | 1 μl |
| Sequence: | |
| 5'-ATTAACCCGGGGTTTTTTAGTTTTGCTGGC-3' | |
| (same sequence SQ ID No. 4 given later) | |

TABLE 7-continued

| | |
|---|---|
| Milli-Q water | 76 μl |
| Taq polymerase | 1 μl |
| Total | 100 μl |

Note:
30 Cycles of 94° C. for 1 min, 94° C. for 30 sec, 52° C. for 30 sec, and 74° C. for 40 sec were repeated.

Subsequently, GSH2/pGEM was digested with restriction endonuclease MunI and was then blunt-ended in a conventional manner. To the cleavage end was ligated URA3 gene blunt-ended with restriction endonuclease SmaI in a conventional manner, for integration therein (referred to as "URA3-GSH2/pGEM" hereinbelow).

By using the URA3-GSH2/pGEM as the template, the PCR method was effected by using gene primers encoding both the ends of GSH2 (the aforementioned GAL11F, GSH2R), to prepare the GSH2 gene disrupting cassette. The PCR conditions are given in Table 8 below.

TABLE 8

| | |
|---|---|
| 10 ng/μl URA3-GSH2/pGEM | 1 μl |
| 10x PCR buffer | 10 μl |
| 10 mM dNTPs | 10 μl |
| 10 pmol/μl GAL11F (primer) Sequence: described previously (same sequence SQ ID No. 1 given later) | 1 μl |
| 10 pmol/μl GSH2R (primer) Sequence: 5'-AGCTAAATGGTGTACTTCGCTAC-3' (same sequence SQ ID No. 5 given later) | 1 μl |
| Milli-Q water | 76 μl |
| Taq polymerase | 1 μl |
| Total | 100 μl |

Note:
30 Cycles of 94° C. for 1 min, 94° C. for 30 sec, 56° C. for 30 sec and 74° C. for 1 min were repeated.

(2) Using the GSH2 gene disrupting cassette (referred to as "URA3-GSH2" hereinbelow), the GSH2 gene of Strain H4 of the yeast mutant for use in food was disrupted.

First, Strain H4 was preliminarily cultured in 3 ml of the YPD culture medium under shaking at 30° C. for 24 hours. One milliliter of the resulting culture liquid was transferred in 50 ml of the YPD culture medium, and culturing was continued upto the logarithmic growth stage. Thereafter, URA3-GSH2 was blended into the culture in suspension in 1M sorbitol, for subsequent electroporation in a conventional manner. Thus, Strain H4 was recovered, where the GSH2 gene had been replaced by the disrupting cassette (the resulting strain being referred to as "H4ΔGSH2" hereinbelow).

(b) The yeast mutant for use in food, containing γ-glutamylcysteine in an amount of 1% or more based on the dry yeast cells, was prepared as follows.

The H4ΔGSH2 strain was preliminarily cultured in 3 ml of a synthetic minimum essential culture medium containing 1 mm glutathione, under shaking at 30° C. for 24 hours. One milliliter of the resulting culture liquid was transferred in 50 ml of a synthetic minimum essential culture medium containing 5 mM cysteine, and culturing was continued for 48 hours. Then, the yeast cells were collected. The collected cells were washed with distilled water three times, and were then subjected to an extraction process at 70° C. for ten minute, to extract the cell contents.

Figure 7:
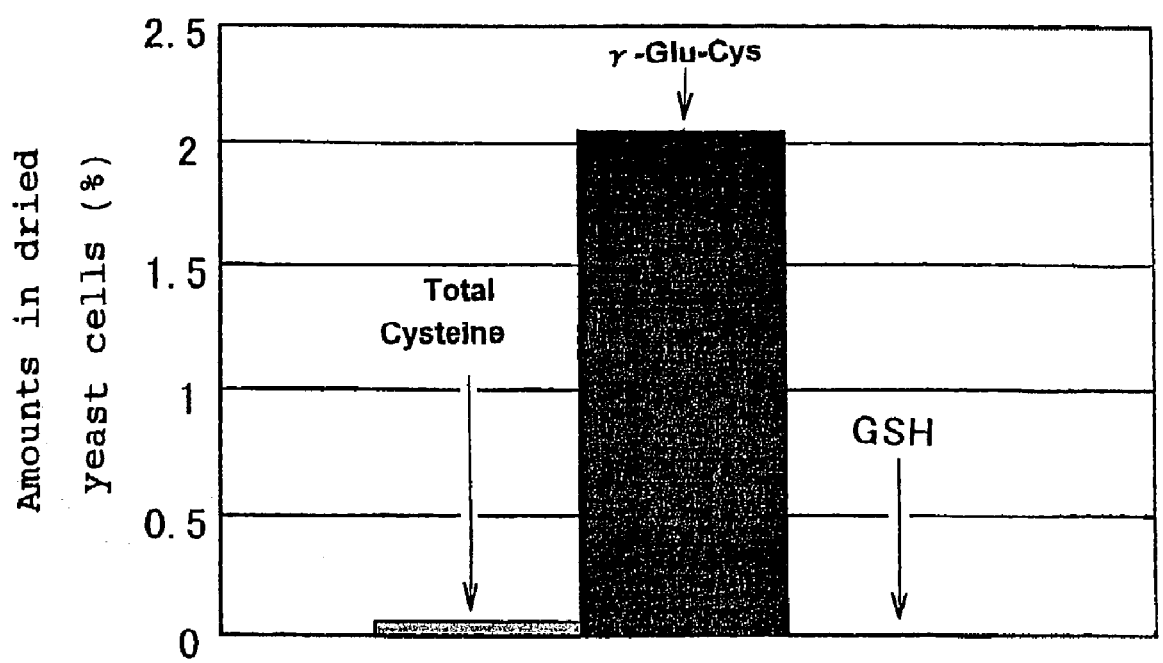
FIG. 7 shows the amounts of the sulfur-containing compounds in the H4ΔGSH2 yeast cells (Example 7).

The supernatant (yeast extract solution) collected by centrifuging the extract, was assayed to determine the γ-glutamylcysteine content therein. The content of the γ-glutamylcysteine consequently recovered per the dry yeast cells is shown in FIG. 7. Herein, the dry yeast cell weight was defined as the yeast cell weight measured by placing the yeast cells contained in a given culture medium on a filter paper, heating the yeast cells at 105° C. for 4 hours, followed by measuring the weight of the yeast cells after so heat-dried.

Furthermore, the yeast extract solution was lyophilized into a powder in a conventional manner, 20.2 mg of the powder was dissolved in 1 ml of water, and the solution was then adjusted to pH 5. A part of the resulting solution was heated at 98° C. for 3 hours. Then, the contents of the γ-glutamylcysteine and the cysteine in the yeast extract (yeast extract) prior to and after heating were assayed. The results are shown in FIG. 8.

Figure 8:
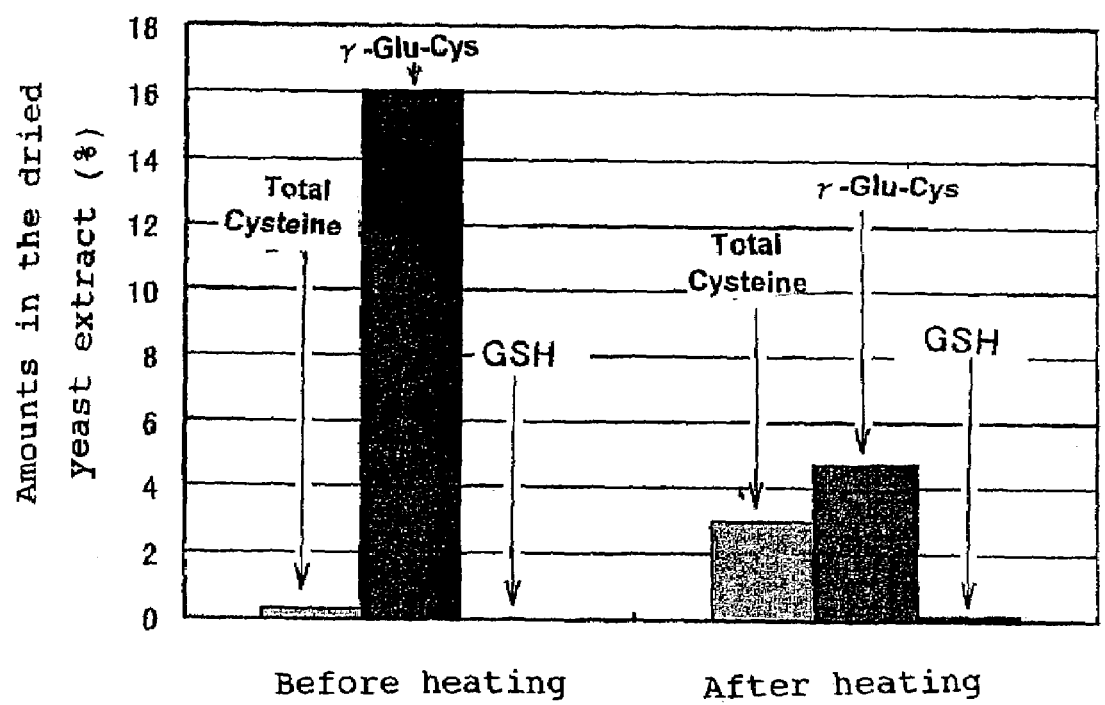
FIG. 8 shows the change in amounts of the sulfur-containing compounds in the H4ΔGSH2 yeast extract (Example 7).

In FIGS. 7 and 8 above, "Total cysteine" means "cysteine", "γ-Glu-Cys" means "reduced-form γ-glutamylcysteine", and "GSH" means "glutathione", respectively.

It is needless to say that the yeast cells and a yeast extract containing a high content of γ-glutamylcysteine, which have been produced by the inventive production method, can not only be used as the starting material for producing the cysteine-rich food material, flavor-enhancing material for foods, or flavor-enhancing agent for foods of the present invention, but also serve as an excellent source of γ-glutamylcysteine or cysteine for other uses.

INDUSTRIAL APPLICABILITY

According to the present invention, a natural food material with a high content of cysteine, such as a yeast extract with a high content of cysteine useful in flavor improvement of foods, can be easily obtained.

Also, according to the present invention, a flavor-enhancing material for foods and a flavor-enhancing agent for foods which can enhance flavors such as beef flavors and dried-bonito flavors in foods, and are free of the problem of strong burnt smells or the like, can be easily obtained.

Still further, according to the method of the present invention can be easily obtained yeast cells containing γ-glutamylcysteine in a large amount.

The invention claimed is:

1. A process for producing a cysteine-containing food material, which comprises
decomposing γ-glutamylcysteine present in a food material containing γ-glutamylcysteine at a ratio of 1 or more weight % to the solid content thereof, at a temperature of 50 to 120° C. and a pH value of 1 to 7 without the addition of a sugar and wherein said food material contains water.

2. A process for producing a cysteine-containing food material, which comprises
hydrolyzing γ-glutamylcysteine by reacting a food material containing γ-glutamylcysteine at a ratio of 1 or more weight % to the solid content thereof with a γ-glutamyl peptide hydrolase at a pH value of 3 to 9 and a temperature of 15 to 70° C., wherein said food material contains.

3. The process for producing a cysteine-containing food material according to claim 2, wherein said γ-glutamyl peptide hydrolase is an enzyme selected from the group consisting of γ-glutamyl transferase, γ-glutamyl cyclotransferase and glutaminase.

4. The process for producing a cysteine-containing food material according to claim 1, wherein said food material containing γ-glutamylcysteine at a ratio of 1 or more weight % to the solid content thereof is a yeast extract or yeast cells.

5. A process for producing a flavor-enhancing material for foods, which comprises
decomposing γ-glutamylcysteine or decomposing γ-glutamylcysteine present in a food material containing γ-glutamylcysteine at a ratio of 1 or more weight % to the solid content thereof, at a pH value of 1 to 7 and a temperature of 50 to 120° C. for a period of 3 to 300 minutes without the addition of a reducing sugar and wherein said food material contains water, and then, after said decomposing, adding a reducing sugar to the resulting mass from said heat-treating in an amount of 1 to 10 moles per 1 mole of the γ-glutamylcysteine present in said resulting mass.

6. A process for producing a flavor-enhancing material for foods, which comprises hydrolyzing γ-glutamylcysteine by reacting γ-glutamylcysteine or a food material containing γ-glutamylcysteine at a ratio of 1 or more weight % to the solid content thereof with a γ-glutamyl peptide hydrolase at a pH value of 3 to 9 and a temperature of 15 to 70° C. for a period of 1 to 300 minutes, wherein said food material contains, and then, after said hydrolyzing, adding a reducing sugar to the resulting mass from said hydrolyzing in an amount of 1 to 10 moles per 1 mole of the γ-glutamylcysteine present in said resulting mass.

7. The process for producing a flavor-enhancing material for foods according to claim 6, wherein said γ-glutamyl peptide hydrolase is an enzyme selected from the group consisting of γ-glutamyl transferase, γ-glutamyl cyclotransferase and glutaminase.

8. A process for producing a flavor-enhancing agent for foods, which comprises heat-treating the flavor-enhancing material for foods as described in claim 5 at a temperature of 50 to 180° C. for a period of 10 to 300 minutes.

9. The process for producing a cysteine-containing food material according to claim 1, wherein water is added to said food material prior to said decomposing.

10. The process for producing a cysteine-containing food material according to claim 2, wherein water is added to said food material prior to said hydrolyzing.

11. The process for producing a cysteine-containing food material according to claim 2, wherein said food material containing γ-glutamylcysteine at a ratio of 1 or more weight % to the solid content thereof is a yeast extract or yeast cells.

12. The process for producing a cysteine-containing food material according to claim 3, wherein said food material containing γ-glutamylcysteine at a ratio of 1 or more weight % to the solid content thereof is a yeast extract or yeast cells.

13. The process for producing a cysteine-containing food material according to claim 5, wherein water is added to said food material prior to said decomposing.

14. The process for producing a cysteine-containing food material according to claim 6, wherein water is added to said food material prior to said hydrolyzing.

15. A process for producing a flavor-enhancing agent for foods, which comprises heat-treating the flavor-enhancing material for foods as described in claim 6 at a temperature of 50 to 180° C. for a period of 10 to 300 minutes.

16. A process for producing a flavor-enhancing agent for foods, which comprises heat-treating the flavor-enhancing material for foods as described in claim 7 at a temperature of 50 to 180° C. for a period of 10 to 300 minutes.

* * * * *

UNITED STATES PATENT AND TRADEMARK OFFICE
CERTIFICATE OF CORRECTION

PATENT NO. : 7,118,775 B2  
APPLICATION NO. : 10/307431  
DATED : October 10, 2006  
INVENTOR(S) : Masanori Kohmura et al.

It is certified that error appears in the above-identified patent and that said Letters Patent is hereby corrected as shown below:

Column 2, line 27, "(the "claims" section" should read-- (the "Claims" section--

Column 6, lines 28-29, "Incidentally, such yeast cells with" should read-- Incidentally, such yeast cells with--

Column 6, line 33, "or by supplmenting, with" should read-- or by supplementing with--

Column 13, line 40, "thereof, respecticely, and" should read-- thereof, respectively, and--

Column 17, line 67, "wherein said food material contains." should read-- wherein said food material contains water.--

Column 19, line 15, "food material contains, and" should read-- food material contains water, and--

Signed and Sealed this

Twenty-sixth Day of June, 2007

JON W. DUDAS  
*Director of the United States Patent and Trademark Office*